US006763625B2

(12) United States Patent
Durham

(10) Patent No.: US 6,763,625 B2
(45) Date of Patent: Jul. 20, 2004

(54) VEHICLE CROSSBAR/SHOULDER-STRAP COVER WITH DISPLAY POCKET

(76) Inventor: Daniel L. Durham, 1750 Corner, Fremont, MI (US) 49412

( * ) Notice: Subject to any disclaimer, the term of this patent is extended or adjusted under 35 U.S.C. 154(b) by 83 days.

(21) Appl. No.: 10/054,264

(22) Filed: Jan. 21, 2002

(65) Prior Publication Data

US 2003/0136038 A1 Jul. 24, 2003

(51) Int. Cl.[7] ........................ B60R 21/055; G09F 21/04
(52) U.S. Cl. ........................... 40/590; 40/320; 297/482; 280/304.3; 280/751; 74/551.8
(58) Field of Search .......................... 40/633, 665, 320, 40/590; 297/482; 224/412; 280/288.4, 304.3, 751; 74/551.8

(56) References Cited

U.S. PATENT DOCUMENTS 3,279,107 A * 10/1966 Baumgartner ................ 40/665
5,219,104 A * 6/1993 Hinschlager et al. ....... 224/412
5,477,633 A * 12/1995 Leinberger ................... 40/661
5,871,269 A * 2/1999 Chien ......................... 362/474
6,189,968 B1 * 2/2001 Emanuel et al. .............. 40/320

OTHER PUBLICATIONS

*FX Factory Effex® Two Thousand One*, three pages, (not dated).

* cited by examiner

*Primary Examiner*—Cassandra H. Davis
(74) *Attorney, Agent, or Firm*—Price, Heneveld, Cooper, DeWitt & Litton

(57) ABSTRACT

A device for displaying printed material is configured to be releasably attached to a component of a vehicle to facilitate easy retrieval and/or viewing of the printed material. The device includes a flexible base sheet, a flexible pocket secured to the base sheet or a flexible panel secured to the base sheet to define a pocket, and a releasable fastener connect to the flexible base sheet to allow releasable attachment of the device to a component of a vehicle. The releasable fastener is configured to connect opposite edges of the device together so that the device can be wrapped around a vehicle component and secured thereto by connection of opposite edges of the device.

10 Claims, 3 Drawing Sheets

VEHICLE CROSSBAR/SHOULDER-STRAP COVER WITH DISPLAY POCKET

FIELD OF THE INVENTION

This invention pertains to display devices that are releasably mountable to a vehicle component, and more particularly to a device for displaying printed material which is mountable to a vehicle crossbar or shoulder strap.

BACKGROUND OF THE INVENTION

It is often desirable to view a map, photograph, instructions, and/or other printed material while riding, driving or being seated in or on a vehicle such as a bicycle, motorcycle, automobile or the like. For example, it may be desirable to view a map and/or instructions to a destination while on route to the destination. Typically, a driver or passenger will place maps and/or instructions to a destination in a door pocket, glove box or other compartment or bin of the vehicle for subsequent retrieval while on route to the destination. A problem with this approach is that the driver or passenger may have difficulty retrieving the map and/or instructions while driving or riding the vehicle, either because the driver or passenger has forgotten where the map and/or instructions were place or because the map and/or instructions were placed in a location which is not easily accessible from a seated position in the vehicle. It may be especially difficult for a driver to retrieve printed materials from a compartment or bin while driving.

As another example, a competitor in a motorcycle race or bicycle race may wish to review the racecourse layout and/or notes while waiting for the race to start. In such events, it is not uncommon for participants to affix printed materials such as a course layout and/or notes to the handlebar or other part of the motorcycle or bicycle using adhesive tape, so that the printed material is in plane view to the race participant when the participant is seated on the motorcycle or bicycle. A problem with this technique of the displaying printed material in plane view to a seated cyclist is that the cyclist must either remember to bring adhesive tape to the competition or find a sympathetic competitor or spectator who is willing to share his/her adhesive tape. Another problem is that the printed material can become easily damaged, soiled or dislodged, especially if the weather is inclement. Also, some cyclists would prefer to display printed material that is in plane view when the cyclist is seated on the vehicle without leaving an adhesive residue on vehicle components.

Accordingly, it would be desirable to provide a device that can be used to display and/or stow printed materials, such as maps, notes, instructions, photographs and the like, and which can be easily and releasably attached to a vehicle component for easy retrieval and/or viewing.

SUMMARY OF THE INVENTION

The invention provides a device for displaying printed material and which is configured to be releasably attached to a component of a vehicle thereby facilitating accessibility and/or viewability of the printed material to a driver or a passenger seated in or on the vehicle.

The device includes a flexible base sheet, a flexible panel superposed over at least a portion of the flexible base sheet and secured to the flexible base sheet along at least two opposing edges of the flexible panel to form a pocket having an opening along at least one edge of the flexible panel, wherein either the flexible base sheet or the flexible panel is transparent, and a releasable fastener connected to the flexible base sheet to allow repeated releasable attachment of the device to a component of a vehicle. Printed material may be inserted into the pocket and viewed through at least one of the flexible base sheet or the flexible panel while the device is releasably attached to a vehicle component, such as a shoulder strap of an automobile, or a motorcycle or bicycle crossbar.

These and other features, advantages and objects of the present invention will be further understood and appreciated by those skilled in the art by reference to the following specification, claims and appended drawings.

DESCRIPTION OF THE PREFERRED EMBODIMENTS

Figure 1:
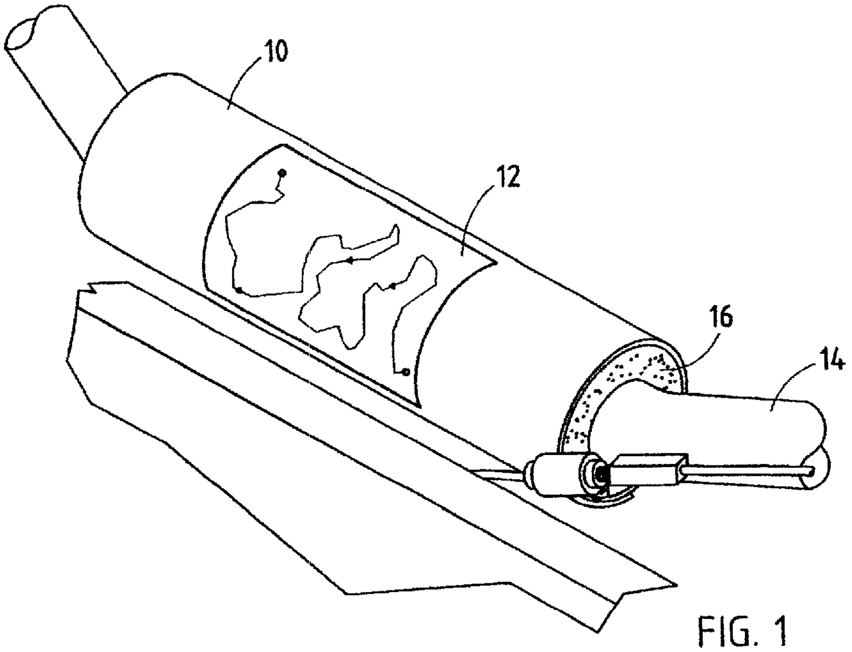
FIG. 1 is a fragmented perspective view of a first embodiment of the invention being used as a motorcycle crossbar pad cover.

In FIG. 1, there is shown a device 10 for displaying printed material 12 on a motorcycle cross-bar 14, so that the motorcycle rider can easily view the printed material from a seated position on the motorcycle. As shown in FIG. 1, device 10 may be used in place of a conventional crossbar pad cover to hold a foam pad 16 on crossbar 14.

Figure 2:
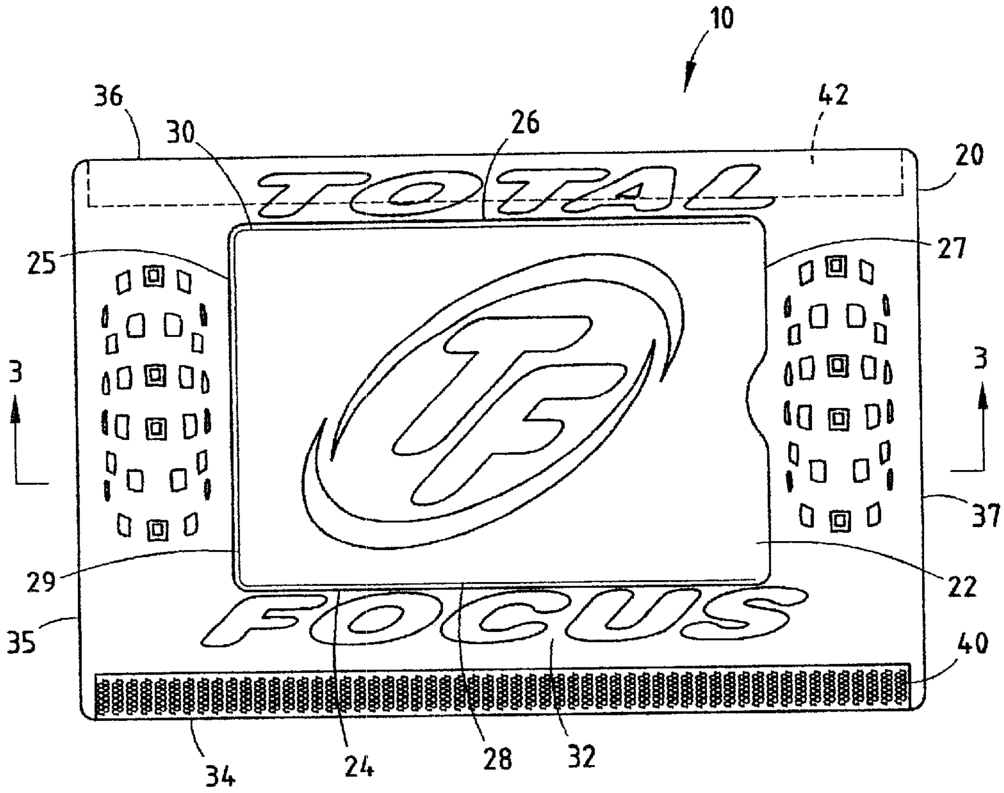
FIG. 2 is top view of the device shown in FIG. 1.

As shown in FIG. 2, device 10 comprises a flexible base sheet 20, and a flexible panel 22 that is superposed over at least a portion of the flexible base sheet and secured to the flexible base sheet to form a pocket into which the printed material may be inserted.

For device 10 illustrated in FIGS. 1 and 2, flexible panel 22 has a generally rectangular shape and is connected to base sheet 20 along three edges 24, 25 and 26 of flexible panel 22, with the fourth edge 27 being unattached to the base sheet to provide an opening for a pocket defined between flexible base sheet 20 and flexible panel 22. However, a suitable pocket-like structure for retaining printed material can be provided by securing opposite edges, such as edges 24 and 26 of flexible panel 22, to flexible base sheet 20 and leaving edges 25 and 27 unattached to base sheet 20, whereby printed material may be inserted or withdrawn from a pocket defined between base sheet 20 and panel 22 from an opening along either edge 25 or edge 27. However, in order to minimize the possibility of moisture, dirt, dust and other materials from entering the pocket, and to minimize the possibility that the printed material inserted into the pocket will unintentionally become dislodged from the pocket, it is generally preferred that the pocket defined between base sheet 20 and panel 22 have an opening along only one edge, (e.g., 27) for inserting or removing printed materials.

Also, to minimize the possibility of moisture, dirt, dust and other materials entering the pocket formed between base sheet 20 and panel 22, it is desirable that a substantially continuous, uninterrupted seam be used to join panel 22 to base sheet 20 along edges 24–26. Seam joints 28, 29 and 30 along edges 24, 25 and 26 of flexible panel 22 are preferably formed by employing ultrasonic welding techniques. However, adhesives may be used as an alternative, and in certain applications, the seam joints may be formed by sewing, stitching or basting flexible panel 22 to base sheet 20 along at least two edges of flexible panel 22 to form the pocket into which printed material may be inserted.

In the illustrated embodiment, base sheet 20 is transparent, and panel 22 may be either transparent or non-transparent. In this case, printed material 12 is displayed by inserting the printed material into the pocket formed between base sheet 20 and panel 22 with the printed material that is to be displayed facing toward base sheet 20, whereby device 10 may be wrapped around foam pad 16 with panel 22 disposed between base sheet 20 and foam pad 16. By forming the pocket on the back side of base sheet 20 so that the opening along edge 27 is disposed between base sheet 20 and foam pad 16, the possibility of the printed material 12 being unintentionally dislodged from the pocket is reduced. Further, the possibility of moisture, dirt, dust or other materials entering the pocket is also reduced. However, if desired, the panel 22 may be transparent, and base sheet 20 may be either transparent or non-transparent.

While at least one of the flexible base sheet 20 and the flexible panel 22 is transparent, it is not necessary that the entire area of the flexible panel or the flexible base sheet 20 be transparent, i.e., the objective of displaying printed material through the device can be achieved by providing a transparent window through which the printed material 12 may be seen. For example, with the device shown in FIG. 10, a border area 32 defined between the edges 24–27 of panel 22 and edges 34, 35, 36 and 37 of base sheet 20 may be non-transparent. In this regard, solid colors, designs, slogans, trademarks, and other indicia may be printed on a border area 32 of a device 10 comprising a transparent base sheet 20. For example, indicia may be printed on the border area 32 of a transparent plastic (e.g. polyvinyl) film, either before or after flexible panel 22 has been attached to base sheet 20, and either on the side of base sheet 20 to which panel 22 has been attached or the opposite side. In a preferred embodiment, a transparent plastic panel 22 is joined to a transparent plastic base sheet 20 to form a pocket, and thereafter indicia 38 is printed on the entire back side of device 10, i.e., on both the border area 32 and on the exposed surface of panel 22, whereby printed indicia on panel 22 can be seen through both base sheet 20 and panel 22 when printed material is not disposed within the pocket formed between base sheet 20 and panel 22.

Although the illustrated device 10 includes a pocket formed between a base sheet 20 and a panel 22 having a length and width that are less than the length and width of the base sheet, it is conceivable that the dimensions of the base sheet 20 and panel 22 could be the same, with the resulting pocket formed between the base sheet 20 and panel 22 being capable of displaying printed material covering an area equal to the area of base sheet 20 less any area needed to accommodate seam joints between base sheet 20 and panel 22.

Device 22 includes a releasable fastener that connects opposite edges of the device together to allow repeated releasable attachment of device 10 to a component of a vehicle, such as crossbar 14. Illustrated device 10 includes a Velcro® fastener (generically known as a hook and loop type fastener), including a strip 40 comprising a multiplicity of miniature hooks disposed on the outwardly facing side of device 10 along edge 37, and a loop strip 42 comprised of felt-like material disposed on the opposite inwardly facing side of base sheet 20, along edge 35. The loop strip 42 and/or hook strip 40 are preferably at sufficient width to allow a degree of adjustability to accommodate variations in the size of the component to which the device is secured and/or to adjust the tension on the device when it is secured to a vehicle component. While the hook and loop style fasteners are particularly preferred, other types of fasteners such as straps, buckles, buttons, hooks, snap-fit fasteners and the like may be employed to connect opposite edges of the device together to facilitate repeated attachment of the device to, and detachment of the device from, a vehicle component.

In accordance with the objectives of the invention, the flexible base sheet and the flexible panel comprise a sheet material that is sufficiently pliable to allow device 10 to be easily wrapped around an object such as cross-bar foam pad 16.

Figure 4:
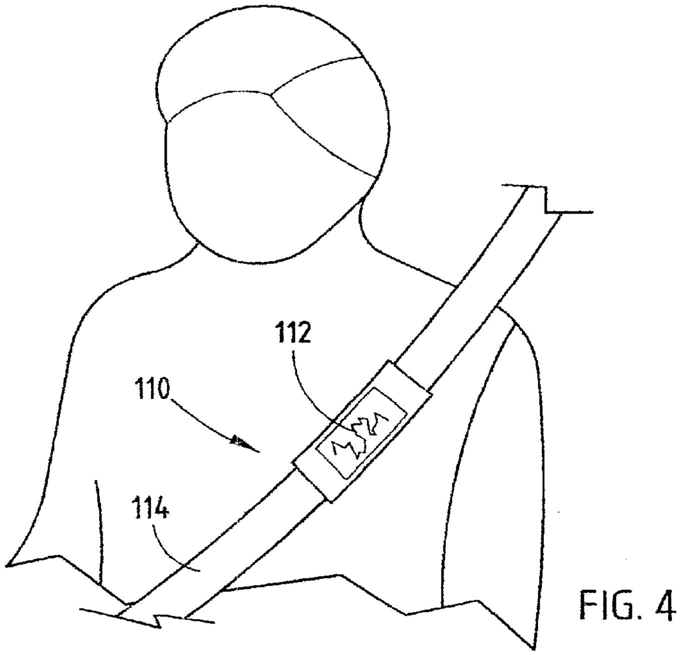
FIG. 4 is fragmented perspective view of a second embodiment of the invention being used as a shoulder-strap comfort pad.
Figure 5:
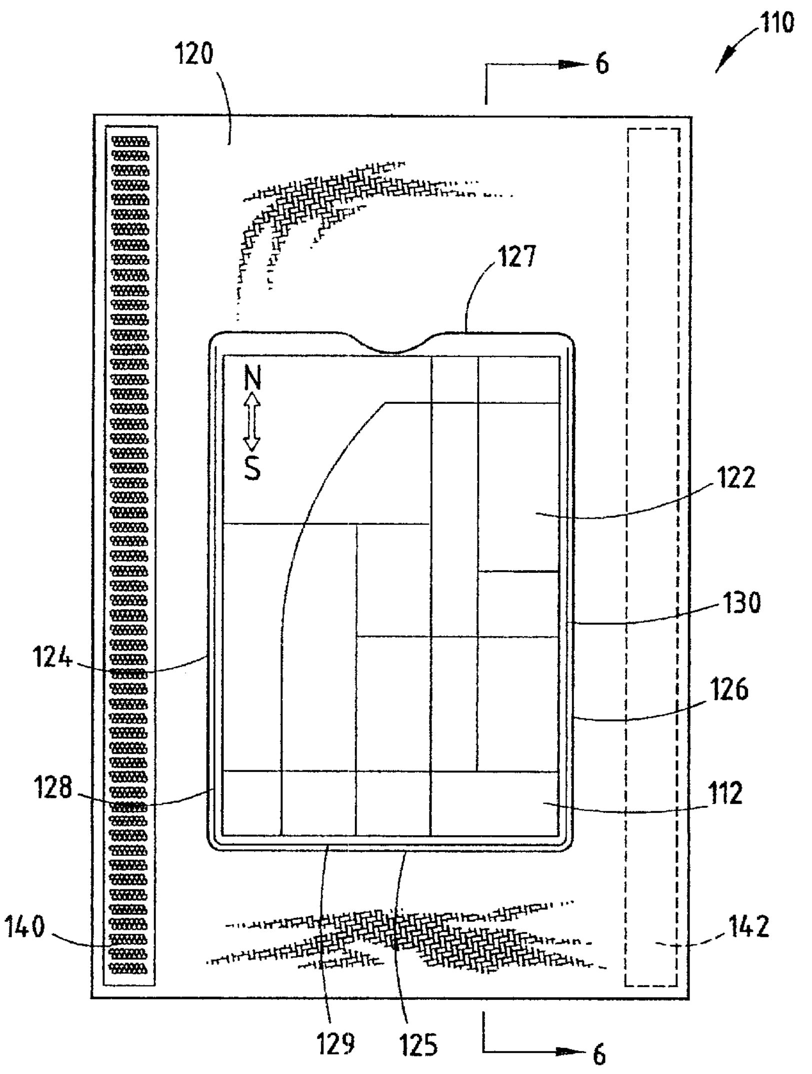
FIG. 5 is a top view of the device shown in FIG. 4.
Figure 6:
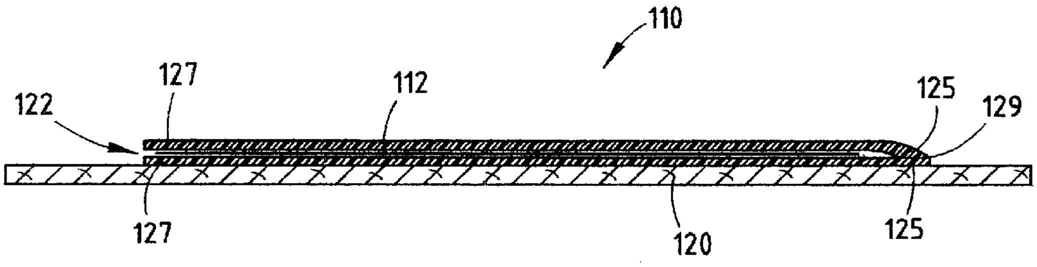
FIG. 6 is a cross sectional view of the device shown in FIGS. 4 and 5, as viewed along lines 6—6 of FIG. 5.

An alternative embodiment of the invention suited for use as a combination display device and shoulder-strap comfort pad is shown in FIGS. 4 and 5. The alternative device 110 has a pocket for displaying printed material 112. However, device 110 is adapted to be wrapped around a vehicle shoulder strap 114. Rather than utilizing a transparent plastic film as with the embodiment shown in FIGS. 1 and 2, flexible base sheet 120 is comprised of a cloth or fabric material that is relatively thick and soft to provide a cushioning effect when device 110 is wrapped around shoulder strap 114. The cushioning or padding effect of device 110 reduces discomfort associated with use of a vehicle shoulder strap 114. Base sheet 120 may be made of any of a variety of fabrics such as felt, felt-like materials, corduroy, and other materials, or composite materials, such as a composite comprising a cloth liner, a cloth outer fabric, and a relatively thin flexible foam material disposed between the liner and the outer fabric material.

If device 110 is intended solely or primarily for use as a display device that is releasably attachable to a component such as a shoulder belt, without regard to, or with little regard to, reducing discomfort associated with use of a vehicle shoulder strap, then base sheet 120 may be made from any sheet material having sufficient pliability and/or flexibility to allow device 110 to be wrapped around a component such as a shoulder belt. However, if device 110 is intended to serve dual functions, including display of printed material 110 and reducing discomfort associated with use of vehicle shoulder straps, then base sheet 120 is selected base on both flexibility and cushioning criteria.

Figure 3:
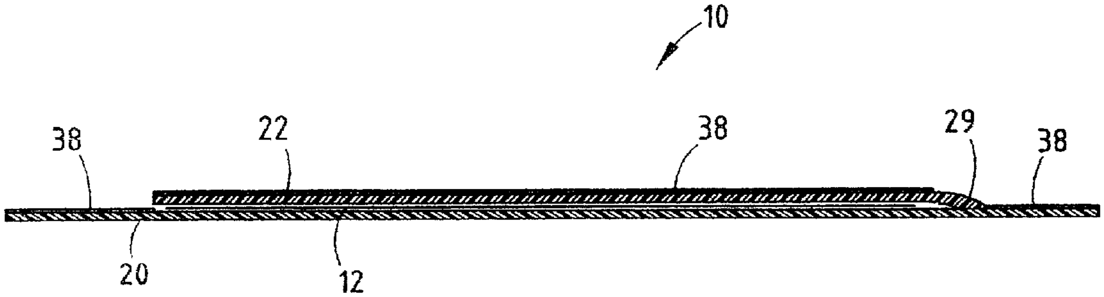
FIG. 3 is a cross sectional view of the device shown in FIGS. 1 and 2, as viewed along lines 3—3 of FIG. 2.

In the device 110 illustrated in FIGS. 3 and 4, a pocket 122 is attached to base sheet 120. Pocket 122 comprises overlapping rectangular panels joined together along three edges 124, 125 and 126 forming seam joints 128, 129 and 130. Overlapping edges 127 are not attached to each other to provide an opening to the pocket. Pocket 122 may be secured to base sheet 120 using any suitable technique such as adhesives, thermal fusion, ultrasonic welding, stitches, staples, etc.

As with the device 10 shown in FIGS. 1 and 2, device 110 includes releasable fasteners comprising a hook strip 140 and a loop strip 142, although other fastening devices suitable for repeatedly connecting and disconnecting the edges of the device may be used.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A combination for displaying printed material on a vehicle component, comprising:

a foam pad configured to be retained on a vehicle component; and a pad cover to hold the foam pad on the vehicle component, the cover including:

a flexible base sheet;

a flexible panel superposed over at least a portion of the flexible base sheet and secured to the flexible base sheet along at least two edges of the flexible panel to form a pocket having an opening, at least one of the flexible base sheet or the flexible panel being transparent, whereby printed material may be inserted into the pocket and viewed through at least one of the flexible base sheet or the flexible panel; and a releasable fastener connected to the flexible base sheet to allow releasable attachment of the pad cover on a component, said releasable fastener being configured to connect opposite edges of the pad cover together.

2. The combination of claim 1, wherein the flexible base sheet is transparent to allow the pocket to be disposed between the base sheet and a vehicle component to which the pad cover is attached.

3. The combination of claim 1, wherein the base sheet is a transparent plastic film.

4. The combination of claim 1, wherein the flexible base sheet is a cloth fabric and the flexible panel is a transparent plastic film.

5. The combination of claim 1, wherein the flexible panel has a generally rectangular shape and is attached to the flexible base sheet along three of the edges of the flexible panel.

6. The combination of claim 1, wherein the releasable fastener comprises a first strip having a multiplicity of miniature hooks on one edge of the pad cover and a second strip having loops that are engageable by the hooks on an opposite edge of the pad cover.

7. A combination of claim 1, wherein in the vehicle component is a motorcycle crossbar.

8. The combination of claim 1, wherein the vehicle component is a bicycle crossbar.

9. The combination of claim 1, wherein the vehicle component is a shoulder strap.

10. A combination comprising:

a motorcycle or bicycle having a handlebar component;

a foam pad configured to be retained on the handlebar component;

a pad cover holding the foam pad on the handlebar component, the cover including:

a flexible base sheet;

a flexible panel superposed over at least a portion of the flexible base sheet and secured to the flexible base sheet along at least two edges of the flexible panel to form a pocket having an opening, at least one of the flexible base sheet or the flexible panel being transparent, whereby printed material may be inserted into the pocket and viewed through at least one of the flexible base sheet or the flexible panel; and a releasable fastener connected to the flexible base sheet to allow releaseable securement of the pad cover on the handlebar component, said releasable fastener being configured to connect opposite edges of the pad cover together.

* * * * *

UNITED STATES PATENT AND TRADEMARK OFFICE
CERTIFICATE OF CORRECTION

PATENT NO. : 6,763,625 B2
APPLICATION NO. : 10/054264
DATED : July 20, 2004
INVENTOR(S) : Daniel L. Durham It is certified that error appears in the above-identified patent and that said Letters Patent is hereby corrected as shown below:

Abstract:
Line 7, “connect” should be --connected--.

Column 1:
Line 22, “place” should be --placed--.
Lines 33, 36, 43, “plane” should be --plain--.

Column 2:
Line 19, “cross sectional” should be --cross-sectional--.
Line 21, After “is” insert --a--.
Line 25, “cross sectional” should be --cross-sectional--.
Line 30, “cross-bar” should be --crossbar--.

Column 4:
Line 17, “cross-bar” should be --crossbar--.
Line 48, “base” should be --based--.

Column 5:
Claim 1, Line 23, “attachment” should be --securement--.
Claim 1, Line 24, “a component” should be --the vehicle component--.

Column 6:
Claim 10, Line 28, “releaseable” should be --releasable--.

Signed and Sealed this
Twenty-eighth Day of December, 2010

David J. Kappos
*Director of the United States Patent and Trademark Office*